(12) United States Patent
Tuchman et al.

(10) Patent No.: US 10,009,759 B2
(45) Date of Patent: *Jun. 26, 2018

(54) METHOD AND SYSTEM FOR ENABLING AND ACTIVATING A FUNCTIONALITY OF AN ELECTRONIC DEVICE

(71) Applicant: TeleTech Holdings, Inc., Englewood, CO (US)

(72) Inventors: Kenneth D. Tuchman, Englewood, CO (US); Bruce A. Sharpe, Aurora, CO (US); Henry D. Truong, Chelmsford, MA (US)

(73) Assignee: TELETECH HOLDINGS, INC., Englewood, CO (US)

( * ) Notice: Subject to any disclaimer, the term of this patent is extended or adjusted under 35 U.S.C. 154(b) by 464 days.

This patent is subject to a terminal disclaimer.

(21) Appl. No.: 14/863,252

(22) Filed: Sep. 23, 2015

(65) Prior Publication Data

US 2016/0014597 A1 Jan. 14, 2016

Related U.S. Application Data

(63) Continuation of application No. 13/234,056, filed on Sep. 15, 2011, now Pat. No. 9,173,090.

(51) Int. Cl.
*H04W 8/26* (2009.01)
*G06Q 20/20* (2012.01)
(Continued)

(52) U.S. Cl.
CPC ............ *H04W 8/265* (2013.01); *G06Q 20/20* (2013.01); *H04W 8/20* (2013.01); *H04L 63/0815* (2013.01); *H04L 67/303* (2013.01); *H04W 4/206* (2013.01)

(58) Field of Classification Search
None
See application file for complete search history.

(56) References Cited

U.S. PATENT DOCUMENTS 6,212,178 B1 4/2001 Beck et al.
6,226,623 B1 5/2001 Schein et al.
(Continued)

FOREIGN PATENT DOCUMENTS

EP 1077412 A2 1/2001
EP 2086167 A1 8/2009

OTHER PUBLICATIONS

"Afaria OneTouch" iAnywhere Solutions, Inc., Dublin, California, 2005, 2 pages.
(Continued)

*Primary Examiner* — Florian M Zeender
(74) *Attorney, Agent, or Firm* — Womble Bond Dickinson (US) LLP

(57) ABSTRACT

A machine-readable code is received at a first server and decoded to obtain a device ID and a first provider ID that identifies a device provider providing the second electronic device. At least one of the machine-readable code or the device ID is transmitted to a second server. A subscribed service that can be activated on the second electronic device is determined based on device metadata of the second electronic device and service metadata of the subscribed service. A first message is transmitted to a mobile device of a user associated with the second electronic device for a permission to activate the subscribed service on the second electronic device. In response to a second message received from the mobile device, the device metadata and the service metadata are transmitted to a third server to request the third server to activate the subscribed service on the second electronic device.

24 Claims, 9 Drawing Sheets

(51) Int. Cl.
  *H04W 8/20* (2009.01)
  *H04L 29/08* (2006.01)
  *H04L 29/06* (2006.01)
  *H04W 4/20* (2018.01)

(56) References Cited

U.S. PATENT DOCUMENTS

| | | | |
|---|---|---|---|
| 6,690,788 | B1 | 2/2004 | Bauer et al. |
| 6,819,759 | B1 | 11/2004 | Khuc et al. |
| 6,934,381 | B1 | 8/2005 | Klein et al. |
| 6,988,126 | B2 | 1/2006 | Wilcock et al. |
| 7,165,213 | B1 | 1/2007 | Busey |
| 7,418,092 | B2 | 8/2008 | Brown |
| 7,450,567 | B1 | 11/2008 | Mamnani |
| 7,496,053 | B1 | 2/2009 | Seabaugh |
| 7,558,382 | B2 | 7/2009 | Torres et al. |
| 7,658,327 | B2 | 2/2010 | Tuchman et al. |
| 7,746,362 | B2 | 6/2010 | Busey et al. |
| 7,761,321 | B2 | 7/2010 | Kannan et al. |
| 7,787,609 | B1 | 8/2010 | Flockhart et al. |
| 8,145,275 | B2 | 3/2012 | Cunningham et al. |
| 8,213,971 | B2 | 7/2012 | Papineau et al. |
| 2003/0191826 | A1 | 10/2003 | Bellinger et al. |
| 2006/0171402 | A1 | 8/2006 | Moore et al. |
| 2006/0218061 | A1 | 9/2006 | Mouline |
| 2007/0041523 | A1 | 2/2007 | Paden et al. |
| 2007/0160188 | A1 | 7/2007 | Sharpe et al. |
| 2007/0221726 | A1 | 9/2007 | Thomas |
| 2007/0276722 | A1 | 11/2007 | Silvera et al. |
| 2007/0293200 | A1 | 12/2007 | Roundtree et al. |
| 2008/0074264 | A1 | 3/2008 | Sharpe et al. |
| 2008/0140438 | A1 | 6/2008 | Bares |
| 2008/0195659 | A1 | 8/2008 | Rawle |
| 2009/0191873 | A1 | 7/2009 | Siegel et al. |
| 2009/0241104 | A1 | 9/2009 | Amiga et al. |
| 2010/0030881 | A1 | 2/2010 | Moreira Sa de Souza et al. |
| 2010/0205540 | A1 | 8/2010 | Gupta et al. |
| 2010/0217837 | A1 | 8/2010 | Ansari et al. |

OTHER PUBLICATIONS

"Check Point Provides One-Touch Secure Access to Corporate Data for Mobile Workers" CMP Media LLC, Oct. 28, 2010, downloaded from http://www.darkreading.com/shared/printableArticleSrc.jhtml?artivleID=228000288, Nov. 10, 2010, 2 pages.

International Search Report and Written Opinion dated Jan. 18, 2013, for International Patent Application No. PCT/US2012/055509, 12 pages.

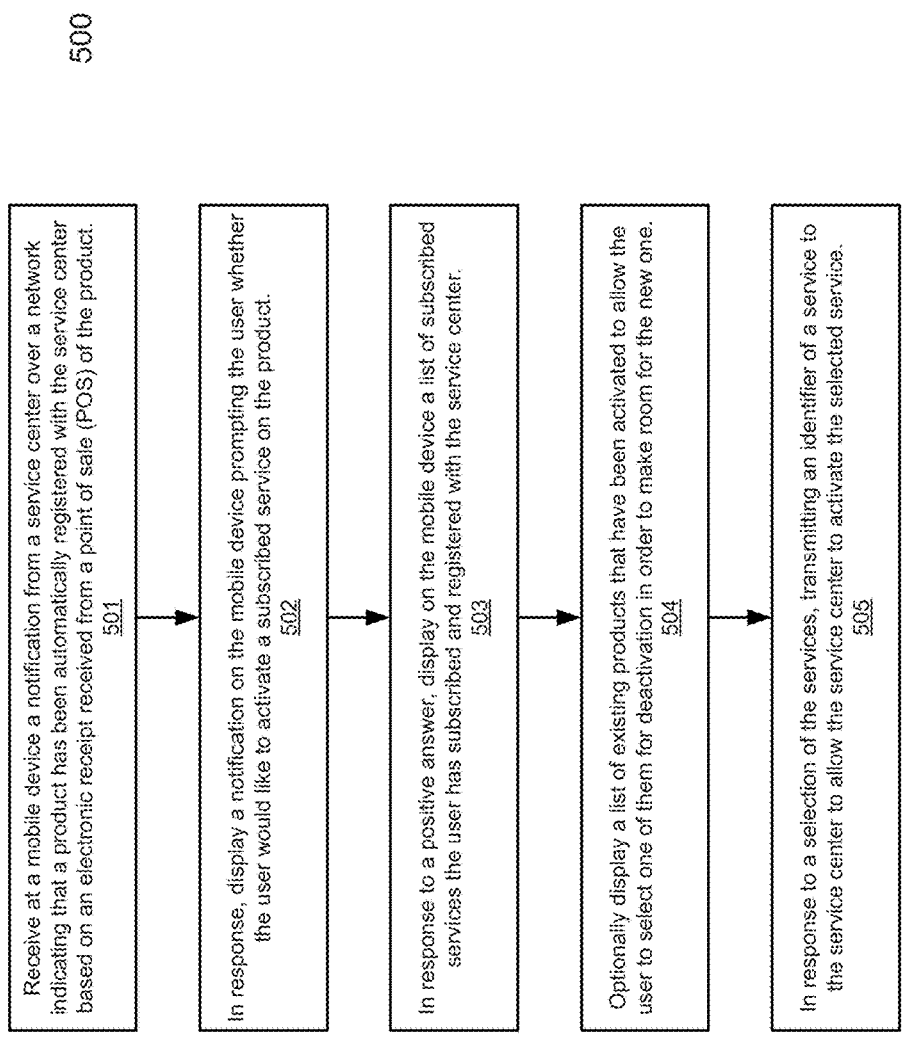

METHOD AND SYSTEM FOR ENABLING AND ACTIVATING A FUNCTIONALITY OF AN ELECTRONIC DEVICE

RELATED APPLICATIONS

This application is a continuation of U.S. patent application Ser. No. 13/234,056, filed Sep. 15, 2011, which is incorporated by reference herein in its entirety.

FIELD OF THE INVENTION

Embodiments of the present invention relate generally to electronic devices. More particularly, embodiments of the invention relate to activating a functionality of an electronic device.

BACKGROUND

Prior to the advent and prolific use of distributed network environments such as the Internet, customer service sessions typically occurred over a teleconference between a customer service agent or service specialist and a customer. These teleconferences, which incidentally are still very popular today, are initiated by a customer placing a phone call to a customer service agent. The customer service agent's phone receives the call through a public-switched telephone network (PTSN). Many support centers handle a large volume of inquiries, usually by phone, for sales, information, customer support and other services. Typical support centers provide the ability to route multiple incoming, customer-initiated calls to agents which provide sales, information, or support on behalf of an entity interested in establishing or maintaining a relationship with the customer.

Modern support center systems selectively route incoming calls based on a number of factors such as the number called or dialed, the originating number, the queued sequence of the caller, the geographic location of the caller, accumulated caller history, and other relevant criteria. Once the system has evaluated the inbound caller's information, if any, the system searches for an available agent to service the call. Availability of agents may be dependent on any number of factors such as a skill level or a schedule of the agent. The number of agents within the contact center and available to the system may often be limited by the physical space available for the agents to operate. Contact centers have to deal with a limited number of agents to handle a large number of incoming customer calls.

As the Internet is getting more popular, customer service providers now provide for computer-based customer service interaction by way of the World Wide Web. Instead of initiating a customer service session by using the phone, customers may access a website and engage in a web-based customer service session to make inquiries (e.g., technical support) and/or perform tasks (e.g., paying bills). Web-based customer service sessions offer numerous advantages over teleconference-based sessions. For example, the graphical user interface of web-based customer service applications permit customers to view illustrations or written explanations and thus ameliorate the miscommunications which may arise with oral conversations between a customer service agent and a customer.

Further, web-based customer service sessions enable a customer to directly target his/her needs on the website and thus reduce the time expended both in navigating through a series of vocal menu choices inapplicable to the consumer's particular needs and in waiting to speak to a service agent. Significantly, web-based customer service sessions are particularly cost-effective for the customer service provider given that fewer agents are required to communicate with customers. Indeed, customers are provided functionality for finding answers to their questions or performing tasks without any help from a live agent. These customer service sessions may be entirely computer-based or, alternatively, involve interaction with a customer service agent.

In some situations, when a consumer purchases a device such as a mobile phone, it requires an activation of a cellular service of a wireless carrier on the device before the device can function properly. Typically, a consumer has to individually contact the wireless carrier and provide all the necessary information (e.g., serial number, international mobile subscriber identity or IMSI) about the device. Often, such information is not readily available to the consumer and such an activation of service becomes tedious to most of the ordinary consumers.

BRIEF DESCRIPTION OF THE DRAWINGS

Embodiments of the invention are illustrated by way of example and not limitation in the figures of the accompanying drawings in which like references indicate similar elements.

FIG. 5 is a flow diagram illustrating a method for activating a subscribed service on a device according to another embodiment of the invention.

DETAILED DESCRIPTION

Figure 1:
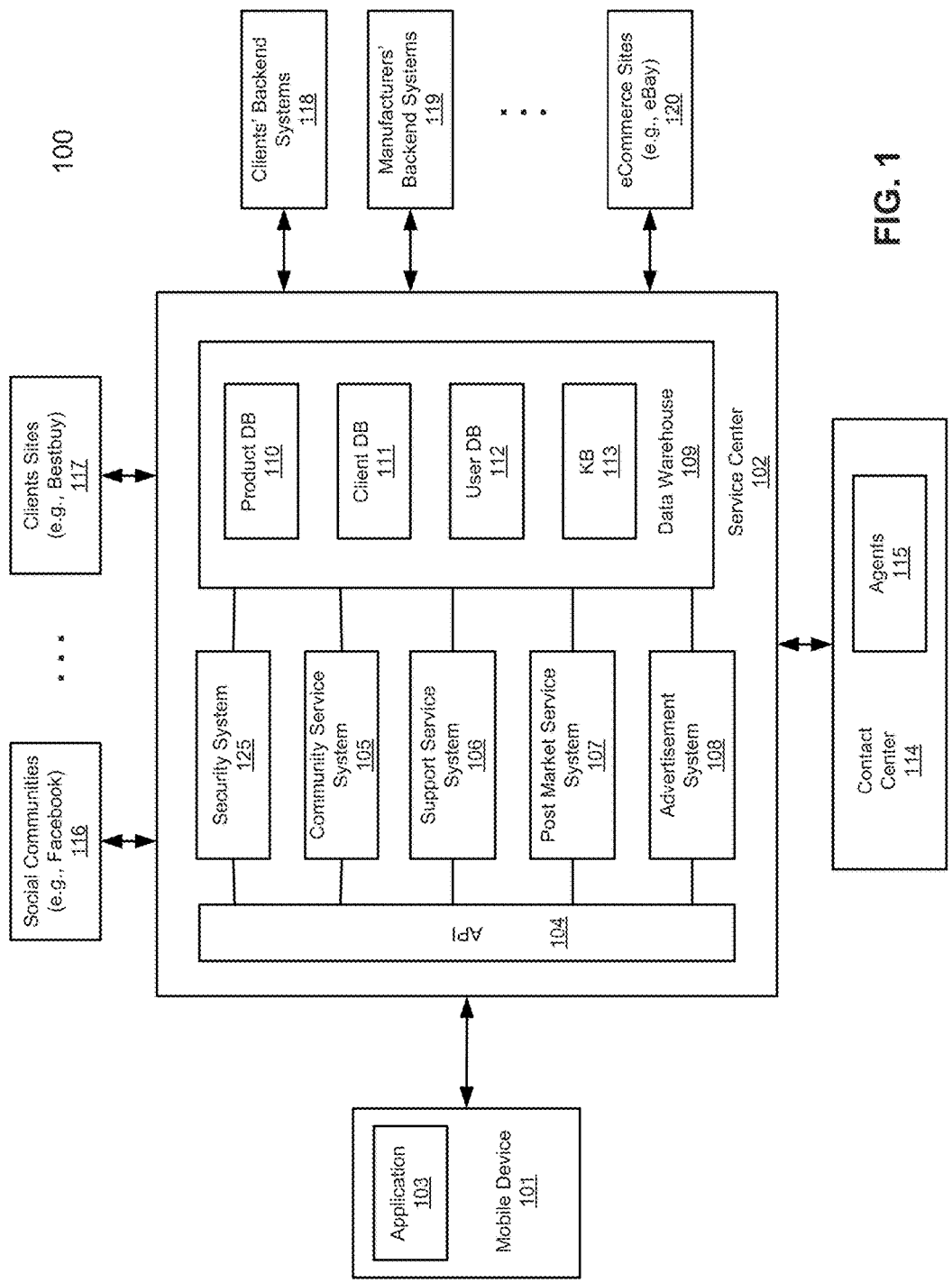
FIG. 1 is a block diagram illustrating a system for providing life cycle services to products according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a service center (also referred to as a support center) is configured to provide services for activating a service on a product acquired by a user. The service to be activated may be a service subscribed by the user (e.g., a cellular plan) and can be activated on a device purchased by the user (e.g., a cellular phone). In one embodiment, in response to a request for activating a service on a device, the service center is configured to communicate with other entities (e.g., retailers, manufacturers, service providers) to compile all of the necessary information concerning the device (e.g., manufacturer, product model, serial number, IMSI, etc.) and subscription information of the subscribed service. The service center then contacts a service provider of the subscribed service on behalf of the user to activate the subscribed service on the device, without having the user to individually contact the service provider. As a result, the hassle of figuring out the detailed information of the device and activating the service on the device can be greatly reduced.

In one embodiment, the service center is configured to proactively identify a subscribed service that can be activated on a device acquired by the user and to prompt the user for permission to activate the subscribed service on the device. For example, when a user acquires or purchases a device and registers the device with the service center for support purposes, the service center can determine that there is a service subscribed by the user can be activated on the newly registered device. The service center then notifies the user of the subscribed service asking permission for activating the service on the device. For example, the service center may transmit a notification to a mobile device of the user regarding the subscribed service and asking for permission. In response to a positive response received from the user, the service center is configured to communicate with the proper parties or partners to activate the subscribed service on the device on behalf of the user.

In one embodiment, the registration of the device may be performed by the service center automatically without user invention or knowledge. For example, when a user purchases a device at a retail location, an electronic receipt of the purchase is automatically transmitted from a point of sale (POS) location to the service center, where the electronic receipt may contain certain information of the device such as a serial number, etc. Based on the electronic receipt, the service center is configured to communicate with the associated parties such as retailer's backend systems and/or manufacturer's backend systems to compile all the necessary information of the device and to register the information in a product asset store associated with the user within or accessible to the service center. Thereafter, the service center determines and notifies the user of the subscribed service asking permission for activating the service on the device. In response to a positive response received from the user, the service center is configured to communicate with proper parties to activate the subscribed service on the device on behalf of the user.

FIG. 1 is a block diagram illustrating a system for providing life cycle services to products according to one embodiment of the invention. Referring to FIG. 1, system 100 includes a mobile device 101 of a user, customer, or individual communicatively coupled to service center 102 over a network. The network may be any kind of networks. Mobile device 101 may be any kind of mobile devices including, but is not limited to, a laptop, mobile phone, tablet, media player, personal digital assistant or PDA, etc.

Service center 102 may be implemented in a centralized facility or server. Alternatively, service center 102 may be implemented in multiple facilities or servers in a distributed manner (e.g., cloud-based service platforms). Service center 102 provides services to a variety of products or services from a variety of clients or vendors. A client may be a manufacturer, a distributor, a retailer, a service provider or broker, a purchasing facility (e.g., Amazon™, Expedia™, or ISIS™), or a combination thereof. In one embodiment, service center 102 includes service APIs 104 to communicate with other systems such as mobile device 101, client's site 117, social communities 116, contact center 114 including agents or experts 115, client backend systems 118, manufacturer backend systems 119, eCommerce sites 120 and other auxiliary systems (e.g., billing system). Service center 102 can handle service requests from customers of multiple clients. For example, a service center may handle customer service requests for a number of retail sales companies, sales calls for catalog sales companies, and patient follow-up contacts for health care providers. In such a structure, the service center may receive service requests directly from the customers or through client support management systems.

In one embodiment, service center 102 further includes community service system 105, support services system 106, post market service system 107, messaging system 108, and data warehouse 109. Support services system 106 is responsible for handling support services requests from the users, including identifying and registering a product, creating an instance case context, selecting and assigning a customer representative (also referred to herein as an agent, specialist, or expert) to provide support services to the users, and managing work flows, etc. An agent may be selected based on a skill set or expertise of the agent, as well as other factors such as geographic location, of the agent. The term "agent," "specialist," or "expert" refers to a service center personnel or a computerized application, in some cases, that respond to customer requests. An agent may be locally situated at the service center or remotely situated over a network. Throughout this application, the terms of "agent," "specialist," and "expert" are interchangeable terms dependent upon the circumstances. In most cases, the term of "agent" collectively refers to a customer representative, a support agent, a support specialist, a support expert, or a combination thereof, which may be a service center personnel and/or a computerized application. Further detailed information concerning service center 102 and/or support service system 106 can be found in co-pending U.S. patent application Ser. No. 13/085,397, filed Apr. 12, 2011, which is incorporated by reference in its entirety.

In one embodiment, community service system 105 is responsible for communicating with social communities 116 via an API, for example, to post a message received from a user and to route the responses received from social communities 116 back to the user. Post market service system 107 is responsible for handling post market activities associated with the registered products, including selling a registered product on eCommerce sites 120 and arranging a disposal facility to dispose or recycle the product, etc.

According to one embodiment, in addition to registering a product with the service center, a user can also register, for example, through the application running within a mobile device, one or more social communities and/or one or more eCommerce sites by storing the necessary credentials (e.g., usernames and passwords) of the servers hosting the social communities and eCommerce sites in a database (e.g., user database) of the service center, where the database is associated with a user the mobile device. Subsequently, the user can transmit a sales request to sell or dispose a registered product by specifying one or more of the eCommerce sites.

In response to the sales request, post market service system 107 of service center 102 is configured to retrieve the necessary credentials for the specified one or more eCommerce sites and arrange the specified eCommerce sites for selling the product together with the associated credentials to allow the eCommerce sites to authenticate the user for the purpose of selling the product, such that the user does not have to provide the necessary credentials at the point in time of the sales request and the user does not have to provide detailed information of the product to be posted on the eCommerce sites describing the product to be sold. A single sales request received from the mobile device can specify multiple eCommerce sites. The service center can also arrange a disposal facility to dispose (e.g., recycle) a registered product without having a user to specifically contact the disposal facility.

Similarly, a user can also post a message to one or more of the registered social communities from the application running within the mobile device without having to individually access the social communities. In one embodiment, a user can transmit a request from mobile device 101 to service center 102, where the request includes a message to be posted and one or more community identifiers identifying one or more registered social communities. In response, community service system 105 of service center 102 is configured to retrieve the associated credentials from the database and to post the message to the specified social communities together with the associated credentials allowing the social communities to authenticate the user, without having to prompt the user for their same credentials each time. Further detailed information concerning community service system 105 and/or post market service system 107 can be found in co-pending U.S. patent application Ser. No. 13/185,213, filed Jul. 18, 2011, which is incorporated by reference herein in its entirety.

In one embodiment, messaging or advertisement system 108 is responsible for handling any messages received from a variety of partners or parties, such as client sites 117, client backend systems 118, manufacturer backend systems 119, and eCommerce sites 120. Messages may be related to the registered products of the user, such as, promotions, rewards, and recall messages. Messages may include advertisements from a variety of advertisement providers.

In one embodiment, a user can configure a set of one or more rules to specify whether certain types of messages or advertisements received from vendors or parties (e.g., retailers, manufacturers, social communities, or other advertisement providers), which may or may not be related to a registered product, should be routed to the user. These rules serve as part of message delivery or filtering rules. The service center engages with the related parties to allow the related parties to get in touch with the user by sending certain messages such as product promotions, rewards, and/or recalls, etc. to the user. The service center may send a message to a user via one or more communications channels preferred by the user, which may also be configured as a set of rules and stored in a database associated with the user.

According to another embodiment, an advertisement received from a vendor is delivered by the service center to a mobile device of a user based on a set of delivery rules associated with the user. The advertisement is displayed on a display of the mobile device by an application running therein. In addition, the service center and/or the application are configured to track interactions of the user with respect to the displayed advertisement to determine user behaviors, patterns, or trends in view of the displayed advertisement. An analysis is performed on the user interaction and the result of the analysis may be utilized to configure further advertisement delivery by the service center and/or the vendors.

According to another embodiment, service center 102 is configured to identify users that have at least one common product registered with the service center and are also members of a social community. The service center is configured to send a message to those users to invite them to connect (e.g., becoming friends or following a friend) with each other via the social community. The social community is hosted by a third party and communicatively coupled to the service center over a network. The service center may also deliver messages or items posted by one of those users to another one of those users on behalf of the social community, without requiring such users to individually or directly accessing the social community. The service center can also deliver messages or items to a particular user posted by other users of the social community, where the messages or items are related to a registered product of that particular user.

According to a further embodiment, an application running on a mobile device provides a user friendly graphical user interface (GUI) to allow a user to configure a set of one or more delivery rules concerning whether certain types of messages or advertisements should be received at the mobile device from a service center. The service center is configured to deliver messages or advertisements on behalf of a message or advertisement provider, which can be a client to the service center, a retailer, a manufacturer, a social community, or other content providers. A user can utilize the GUI to configure, for each of the providers, whether a message associated with a particular registered product of the user or all products in general related to the provider should be received by the mobile device. The settings of the delivery rules are then transmitted from the mobile device to the service center to allow the service center to delivery subsequent messages or advertisements on behalf of the message or advertisement providers accordingly. Further detailed information concerning advertisement system 108 can be found in co-pending U.S. patent application Ser. No. 13/185,309, filed Jul. 18, 2011, which is incorporated by reference herein in its entirety.

In one embodiment, data warehouse 109 includes product database 110, client database 111, user database 112, and knowledgebase 113. Product database 110 is configured to store any data related to the registered products including user manuals, etc. Client database 110 is configured to store information related to clients such as client's preferred communications mechanisms. User database 112 is used to store information related users, such as, for example, registered products associated with a user, communications channel preference of a user, credentials necessary for a user to access other sites, and/or messaging filtering settings of a user, etc. Knowledgebase 113 is used to store knowledge collected and compiled over a period of time, which can be used by agents 115 and/or users for self-support purposes.

In one embodiment, service center 102 further includes a multi-channel communication system (not shown) to provide one or more communication channels to any user or client to concurrently access service center 102. Examples of communication channels include email, chat, texting (e.g., short messaging services or SMS), voice (e.g., automated IVR, real-time, or VoIP), video, Web (e.g., Web conferencing), and/or online community forum (e.g., Facebook™ or Twitter™), etc. Note that the multi-channel communication system may be fully or partially integrated with service center 102 or alternatively, it may be maintained or provided by a third party or partner (e.g., communicatively coupled via service API 104 over a network). Service center 102 further includes an automatic caller distribution (ACD) system (not shown) to receive, route, and manage voice calls exchanged via the multi-channel communication system.

A customer can obtain support services from service center 102 via a variety of communication mechanisms. A customer can initiate a support request to contact a live agent such as agents 115 in a live manner. Alternatively, a customer may browse certain knowledgebase, such as KB 113 via a Web interface, in an attempt to find a solution to a problem of a product he/she purchased from a manufacturer via a client of service center 102.

According to one embodiment, service center 102 further includes a security system 125 to authenticate a user of mobile device 101 in order to allow the user accessing services provided by any of systems 105-108. Security system 125 is configured to provide multiple login and authentication options to a mobile device to allow a user to select one or more of the options to access service center 102. The login/authentication options include, but are not limited to, a traditional username and password login/authentication option, a voice login/authentication option, and an image login/authentication option. These options can be utilized individually or in combination dependent upon a particular user configuration or preference, which may be specified and stored in a user profile maintained by service center 102, as part of user database 112. One login/authentication option can be utilized in addition to another login/authentication option or alternatively, one login/authentication option can be utilized as a backup option when another login/authentication option fails.

In one embodiment, in response to a user selection of a voice login option, security system 125 causes mobile device 101 to present predefined one or more phrases and to request the user to speak the presented content to a microphone of the mobile device. A voice recorder of mobile device 101 is configured to capture a voice stream representing the one or more phrases spoken in real time by the user. Mobile device 101 then transmits the captured voice stream to service center 102 over a network. In response, security system 125 is configured to authenticate the user by matching the received voice stream against another voice stream that has been previously registered and stored in a database associated with the user of the service center.

Similarly, a user can also initiate an image or video login option from its mobile device. According to one embodiment, in response to a user selection of an image login option, mobile device 101 requests the user to capture one or more images of the user at the point in time using a camera of mobile device 101. Mobile device 101 then transmits the captured image(s) to service center 102 over a network. In response, security system 125 of service center 102 is configured to authenticate the user by matching the received image(s) against other image(s) that have been previously registered and stored in a database associated with the user of the service center. The previously recorded voice and/or image references may be stored, for example, by a registration system (not shown), in a user account as part of user database 112. Once the service center has successfully authenticated the user, the user can obtain support services or access resources available from the service center as described above regarding one or more products or services that have been registered by the user. Further detailed information concerning security system 125 can be found in co-pending U.S. patent application No. 13/213,000, filed Aug. 18, 2011, which is incorporated by reference herein in its entirety.

According to one embodiment, support service system 106 is configured to provide services for activating a service on a product acquired by a user. The service to be activated may be a service subscribed by the user (e.g., a cellular plan) and can be activated on a device acquired or purchased by the user (e.g., a cellular phone). In one embodiment, in response to a request for activating a service on a device, support service system 106 is configured to communicate with other related entities (e.g., systems 116-120) to compile all of the necessary information concerning the device (e.g., manufacturer, product model, serial number, IMSI, etc.) and subscription information of the subscribed service. Support service system 106 then contacts a service provider of the subscribed service on behalf of the user to activate the subscribed service on the device, without having the user to individually contact the service provider. As a result, the hassle of figuring out the detailed information of the device and activating the service on the device can be greatly reduced.

According to one embodiment, application 103 is installed on mobile device 101 of a customer or user, where application 103 can serve as a central service point to service center 102 that provides support services to a variety of products or services provided by a variety of vendors. The vendors can be, for example, manufacturers, distributors, retailers, service brokers, purchasing houses, etc. of the products. Vendors may be the clients of service center 102 or entities having a business relationship with service center 102. A user (also referred to herein as a customer) can activate application 103 from the user's mobile device 101 to reach agents 105 the service center 102 or KB data center 114 via a variety of communication channels or media, such as, for example, email, chat, voice (including automated interactive voice recognition or IVR, voice over Internet protocol or VoIP), video, Web, and/or online community-based forum, etc. Application 103 can be a thin/thick client application or a Web-based application.

Note that a service center described throughout this application is not limited to a traditional service center or support center, nor is it implemented in a single physical location. A service center described herein represents a collection of service logic or providers communicatively coupled to each other over a network in a distributed or a cloud-based fashion. The term of a service center herein represents any kind of service providers that provide a variety of services to customers or users. As described throughout this application, a service center can be a set of enabling cloud-based service APIs, which enable a variety of consumer product services and support offerings via an intelligent set of technologies providing automated and/or live communications. In one embodiment, services provided by a service center can include, but not limited to: 1) user, product, and loyalty registration and support services; 2) product wish list, reviews, and comparisons; 3) purchasing and accessorizing services; 4) social community support and integration services; 5) intelligent knowledge support services; and 6) integrated sales and product disposition services, etc.

Also note that an agent, an expert, or a customer representative described throughout this application is not limited to a real person. The term of an agent, an expert, or a customer representative can also refer to any processing logic or functional block that is configured or programmed to provide automated services to a customer, for example, via services APIs of the service center, without a need of a real person involved. Such processing logic and/or functional blocks can be implemented in software, hardware, or a combination thereof.

Figure 2:
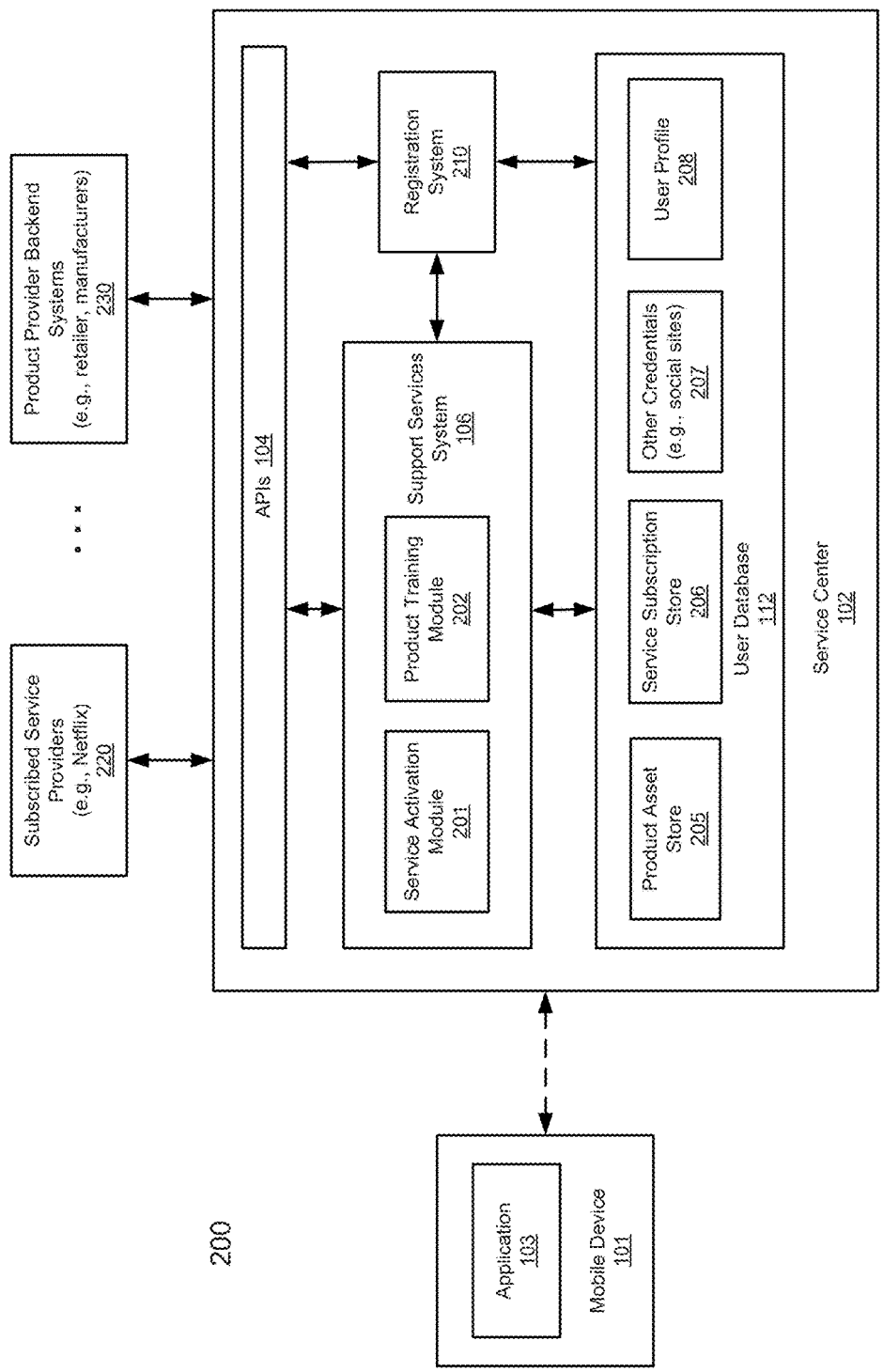
FIG. 2 is a block diagram illustrating an example of a service center according to another embodiment of the invention.

FIG. 2 is a block diagram illustrating a support service system of a service center according to one embodiment of the invention. System 200 may be implemented as part of system 100 of FIG. 1. Referring to FIG. 2, service center 104 includes an application programming interface (API) 104 to allow a client such as mobile device 102 to access resources provided by service center 102. For example, API 104 allows a user of mobile device 102 to obtain support services provided by support service system 106. One of the support services provided by support service system 106 is activation of a subscribed service on a device, which may be a product registered by registration system 210.

In one embodiment, support service system 106 includes a service activation module 201 configured to activate a service on a device on behalf of a user without requiring the user to directly contact a service provider of the service to be activated. The service to be activated may be a service subscribed by the user (e.g., a cellular plan, a media service subscription) and can be activated on a device purchased by the user (e.g., a cellular phone, a media player). In one embodiment, in response to a request for activating a service on a device, service activation module 201 is configured to communicate with other entities 230 (e.g., retailers, manufacturers, service providers) to compile all of the necessary information concerning the device (e.g., manufacturer, product model, serial number, EIN, IMSI, etc.) and subscription information of the subscribed service.

If the device has been previously registered with service center 102, such information may have already been stored in product asset store 205 associated with the user. Similarly, if the subscribed service has been previously registered with service center, subscription information (e.g., subscription identifier and the associated credentials) of the service may have been stored as part of service subscription information in service subscription store 206. User database 112 may also store other information such as credentials for accessing other partners' sites 207 and user profile 208 which may include user preferences, etc. Service activation module 201 then contacts service provider 220 of the subscribed service on behalf of the user to activate the subscribed service on the device, for example, by transmitting the compiled information to service provider 220, without having the user to individually contact the service provider. As a result, the hassle of figuring out the detailed information of the device and activating the service on the device can be greatly reduced.

In one embodiment, service activation module 201 is configured to proactively identify a subscribed service that can be activated on a device acquired by the user and to notify and prompt the user for permission to activate the subscribed service on the device. For example, when a user acquires or purchases a device and registers the device with the service center for support purposes, service activation module 201 can determine that there is a service subscribed by the user can be activated on the newly registered device based on information obtained from product asset store 205 and service subscription store 206. Service activation module 201 then notifies the user of the subscribed service asking permission for activating the service on the device. For example, service activation module 201 may transmit a notification to mobile device 102 of the user regarding the subscribed service and asking for permission. In response to a positive response received from the user received from application 103 of mobile device 102, service activation module 201 is configured to communicate with subscribed service provider 220 to activate the subscribed service on the device on behalf of the user.

Typically, a user can register a product or service by specifically providing detailed information of the product or service to be registered. Alternatively, the user can register the product or service simply by scanning using a camera of mobile device 102 a machine-readable code (e.g., QR code or serial number) of the product or a membership card of the service. Based on machine-readable code, registration system 210 is configured to communicate with all of the related parties (e.g., systems 220 and 230) to compile all the necessary information of the product or service without having the user to specifically provide the detailed information. Registration system 210 is then configured to store the compiled information in product asset store 205 and service subscription store 206, as described in the above incorporated-by-reference patent applications. Note that the product asset store 205 and service subscription store 206 may be implemented as a single store.

In one embodiment, the registration of the device may be performed by registration system 210 automatically without user invention or knowledge. For example, when a user acquires or purchases a device at a retail location, an electronic receipt of the purchase is automatically transmitted from a point of sale (POS) location to service center 102, where the electronic receipt may contain certain information of the device such as a serial number, etc. In this example, the retailer associated with the POS location may be a client of service center 102. Based on the electronic receipt, registration system 210 is configured to communicate with the associated parties such as retailer's backend systems and/or manufacturer's backend systems 230 to compile all the necessary information of the device and to register the information in product asset store 205 associated with the user within or accessible to service center 102. Thereafter, service activation module 201 determines and notifies the user of the subscribed service asking permission for activating the service on the device. In one embodiment, service activation module 201 may transmit the notification to mobile device 101 to be displayed by application 103. In response to a positive response received from mobile device 101, service activation module 201 is configured to communicate with proper parties such as service provider 220 to activate the subscribed service on the device on behalf of the user. A subscribed service can be any kind of services such as cellular calling plans (e.g., AT&T, Verizon), media subscription plans (e.g., Netflix, Pandora), or warranties, etc.

According to some embodiments, a registered user would be allowed to register any number of accounts for subscriptions and services that would be accessed via an electronic device with service center 104. This registration provides a form of single sign on allowing service center 104 to make the necessary authenticated and authorized changes without prompting the user to sign in every time. In one embodiment, a user can register a new device on an existing service or deactivate a device from the same service via application 103, which communicates with service center 104 over a network. A user can also retrieve a summary of the account or make certain feature changes to a device.

If a user does not have a subscription with one or more of the services available via the device (e.g., Netflix), according to one embodiment, the user may be able to connect, for example, via the service center, to the services registration system of the corresponding service provider (e.g., service provider 220) to sign up for subscription of the service. Once the user is signed up and active, the registration system of the service provider can pass to service center 104 the necessary credentials which will allow the user to make changes, activate features, etc., on that specific service. If a user is already registered with a service (e.g., Block Buster) the user can register their login information directly with service center 104, which may be stored in service subscription store 206, to allow the necessary access to the user's account of the service provider when needed. As a result, the user may not be prompted for credentials when changes requested by the user are made.

In some cases specific functionality such as changing a credit card on a service account, etc., would be performed directly with the service provider. A user can at anytime deactivate any number of services on a specific device(s) yet still retain the necessary credentials for such services so that they can reactivate if desired. A user can also elect to terminate a subscribed service (e.g. Pandora) thus removing any or all credential information about the service from service center 104. In the case that a selected service (e.g. Pandora) is terminated (deleted) from service center 104, a user will have to reregister the service information with service center 104 to enable the service on any device.

In some situations, a user may activate a subscribed service on multiple devices registered with service center 104. When a new device is registered with service center 104 or a request for activating a particular service on an additional device, according to one embodiment, service activation module 201 is configured to determine, based on information obtained from product asset store 205 and service subscription store 206, whether the number of existing devices that have been activated with that particular subscribed service reaches a predetermined level allowed by the subscription. If so, service activation module 201 is configured to notify the user and to ask whether the user wishes to deactivate one of the existing devices in order to activate the same service on the new device. In one embodiment, service activation module 201 is configured to transmit a summary of the existing devices that have been activated with the subscribed service to mobile device 101 and cause application 103 to display the summary and to prompt the user selecting one of the existing devices for deactivation. In response to a user selection of one of the existing devices received from mobile device 101, service activation module 201 is configured to communicate with service provider 220 to deactivate the selected existing device and activate the new device.

After the service has been activated on a new device, according to one embodiment, product training module 202 is configured to offer training on operating the device in view of the subscribed service. In one embodiment, training module 202 transmits a media stream such as a video or audio stream to mobile device 101 to be played by a media player of mobile device 101 illustrating the operation of the new device. The training media stream may be maintained by service center 104 or alternatively, it may be downloaded from the corresponding product or service provider's site. Other configurations may exist.

Figure 3:
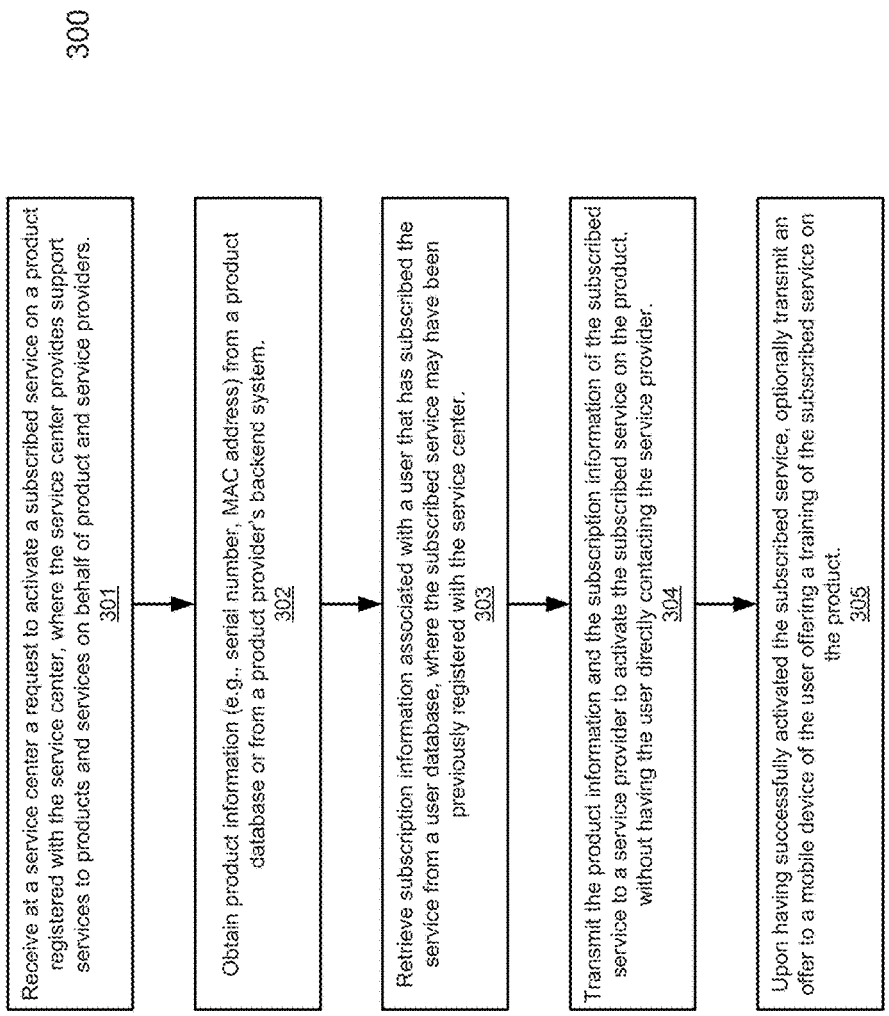
FIG. 3 is a flow diagram illustrating a method for activating a subscriber service on a device according to one embodiment of the invention.

FIG. 3 is a flow diagram illustrating a method for activating a subscriber service on a device according to one embodiment of the invention. Method 300 may be performed by service activation module 201 of FIG. 2. Referring to FIG. 3, at block 301, a request for activating a service on a product or device registered with a service center is received. In response to the request, at block 302, product information of the device is obtained from a product database or from a product provider's backend system. The product information may have been collected and stored in the product database when the product was registered with the service center. At block 303, subscription information of the subscribed service is retrieved from a user database associated with the user. The subscription information may include credentials for accessing the corresponding user account at the subscribed service provider's site. The subscription information may be previously collected when the user registered the subscribed service with the service center. Alternatively, the user may subscribe a new service and the subscription information may be collected at the point in time via the service center. At block 304, the product information and subscription information are transmitted to the subscribed service provider to allow the service provider to activate the service on the product. Upon having successfully activated the service on the product, at block 305, processing logic optionally transmits an offer to a mobile device of the user offering a training of the device and/or the subscribed service.

Figure 4:
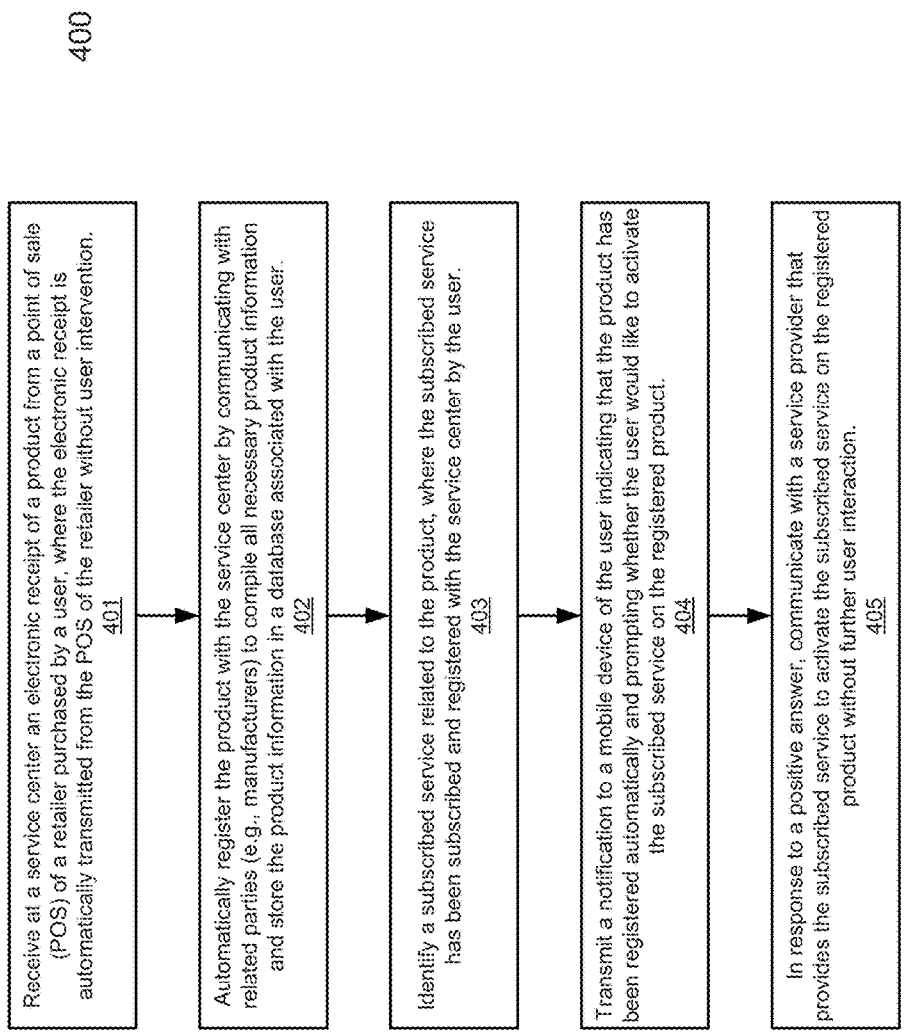
FIG. 4 is a flow diagram illustrating a method for activating a subscriber service on a device according to another embodiment of the invention.

FIG. 4 is a flow diagram illustrating a method for activating a subscriber service on a device according to another embodiment of the invention. Method 400 may be performed by service center 104 of FIG. 2. Referring to FIG. 4, at block 401, an electronic receipt is received at a service center for a product purchased by a user at a point of sale (POS) location (e.g., retailer). The electronic receipt is automatically received without user intervention or knowledge. At block 402, the product is automatically registered with the service center. A registration system of the service center is configured to automatically communicate with all the related parties or partners to compile all the necessary information concerning the product. The product information is then stored in a product asset store associated with the user. At block 403, processing logic identifies a subscribed service that can be activated on the product, for example, automatically without user intervention or knowledge. The subscribed service may have been previously subscribed and registered with the service center, and the subscription information of the subscribed service may have been stored in the service subscription store associated with the user.

At block 404, processing logic notifies the user, for example, by transmitting a notification to a mobile device of the user, indicating that the product has been registered automatically and prompting whether the user wishes to activate a service on the product. If the number of existing products that have been activated reaches a predetermined threshold, processing logic may prompt the user to deactivate at least one of the existing products in order to make room to activate the newly registered product. In response to a positive answer from the user, at block 405, processing logic communicates with a service provider of the subscribed service to activate the service on the newly registered product on behalf of the user, without requiring the user to individually contact the corresponding service provider.

FIG. 5 is a flow diagram illustrating a method for activating a subscribed service on a device according to another embodiment of the invention. Method 400 may be performed by mobile device 101 of FIG. 2. Referring to FIG. 5, at block 501, a notification is received at a mobile device of a user from a service center over a network that a product acquired by the user has been automatically registered with the service center based on an electronic receipt. The service center automatically receives the electronic receipt from a point of sale retail location where the user acquired the product, without user intervention or knowledge. In response, at block 502, a notification is displayed on the mobile device prompting whether the user wishes to activate a subscribed service on the newly registered product. In response to a positive response from the user, at block 503, a list of subscribed services that can be activated on the product may be displayed to allow the user to select one of them to be activated on the product. Each of the listed services is associated with a button or control for selecting the associated service for activation. At block 504, if it is determined that the number of products that have been activated with a selected subscribed service reaches a predetermined threshold (e.g., maximum activations allowed on a particular service), processing logic may optionally display the existing products that have been associated with the subscribed service to allow the user to select one or more of them to be deactivated in order to make room for the newly registered product. In response to a user selection of a subscribed service, at block 505, processing logic transmits an identifier of the selected service to the service center to allow the service center to activate the selected service on the newly registered product.

The above service activation techniques performed by a service center on behalf of a user can be utilized in a variety of situations. A subscribed service could be a movie or music subscription provided by Netflix® or Pandora® and a registered product could be a DVD player. For example, for the purpose of illustration, it is assumed that a customer currently has Netflix service; the Netflix credentials are registered with the service center; and the customer has four devices activated on account already while maximum devices allowed is five. The user is in an electronic store and decides to buy a blue-ray DVD player. The user pays for the DVD player and leaves the store. The service center registers device from POS electronic receipt (e.g., via API) and adds to customers asset inventory. The service center sends a notification to the user that a new asset is added and asks to enable services (e.g., Netflix, Block Buster, Vudu, Pandora, etc.). The user acknowledges, for example, via an application running on a mobile device, to activate the DVD player with its Netflix account. The service center uses product information and unique ID (e.g., serial number, MAC address, etc.) to identify the DVD player and uses customer credentials to register the DVD player's unique ID with Netflix. The user gets home and connects player per instructions (power, TV, network, etc.) and runs Netflix application on the DVD player. Netflix sees the user registered player (ID) and allows access and confirms the user account. This way if the user intends to purchase another device the user is aware that one of the currently utilized devices would have to be deactivated.

In another situation, a subscribed service could be a cellular plan provided by a cellular carrier and a registered product could be a cellular phone. For example, for the purpose of illustration, it is assumed that the customer currently has an account with the wireless carrier and the customer has registered a wireless account and a device with the service center. The customer has more than one phone on the current wireless account. The customer enters a retail store (e.g. Best Buy, Sprint Store, etc.) to buy a new phone. The customer selects phone, makes purchase, and leaves the retail store. The service center receives POS electronic receipt (via API) and adds the new phone into customer's asset store, including model, EIN number, serial number, etc. The service center notifies the customer that the new phone has been added to customer's inventory and asks if the customer would like to activate it. The customer acknowledges activation of the phone and adding the phone to the existing plan. The customer is prompted by the service center, for example, via a mobile application running on a mobile device, whether this phone is "new" and is to be added to user's existing wireless account or a "replace/upgrade" of an existing phone. If the customer responds that the phone is a new phone, the service center is configured to activate the wireless service on new phone. If the customer selects "replace/upgrade", the service center prompts the customer which of the existing phones on the customer account is to be replaced. The customer selects an existing phone to be replaced and the service center collects and submits customer specific information to a wireless carrier. In addition, the service center proceeds with deactivating the selected existing phone, activating the new phone, and updating account information for proper accounting and billing, etc. The wireless carrier activates the phone and notifies the service center of completion. The service center notifies the customer that the new phone is now active and walks the user through testing, software updates and downloading a mobile application, etc.

Figures 6A, 6B:
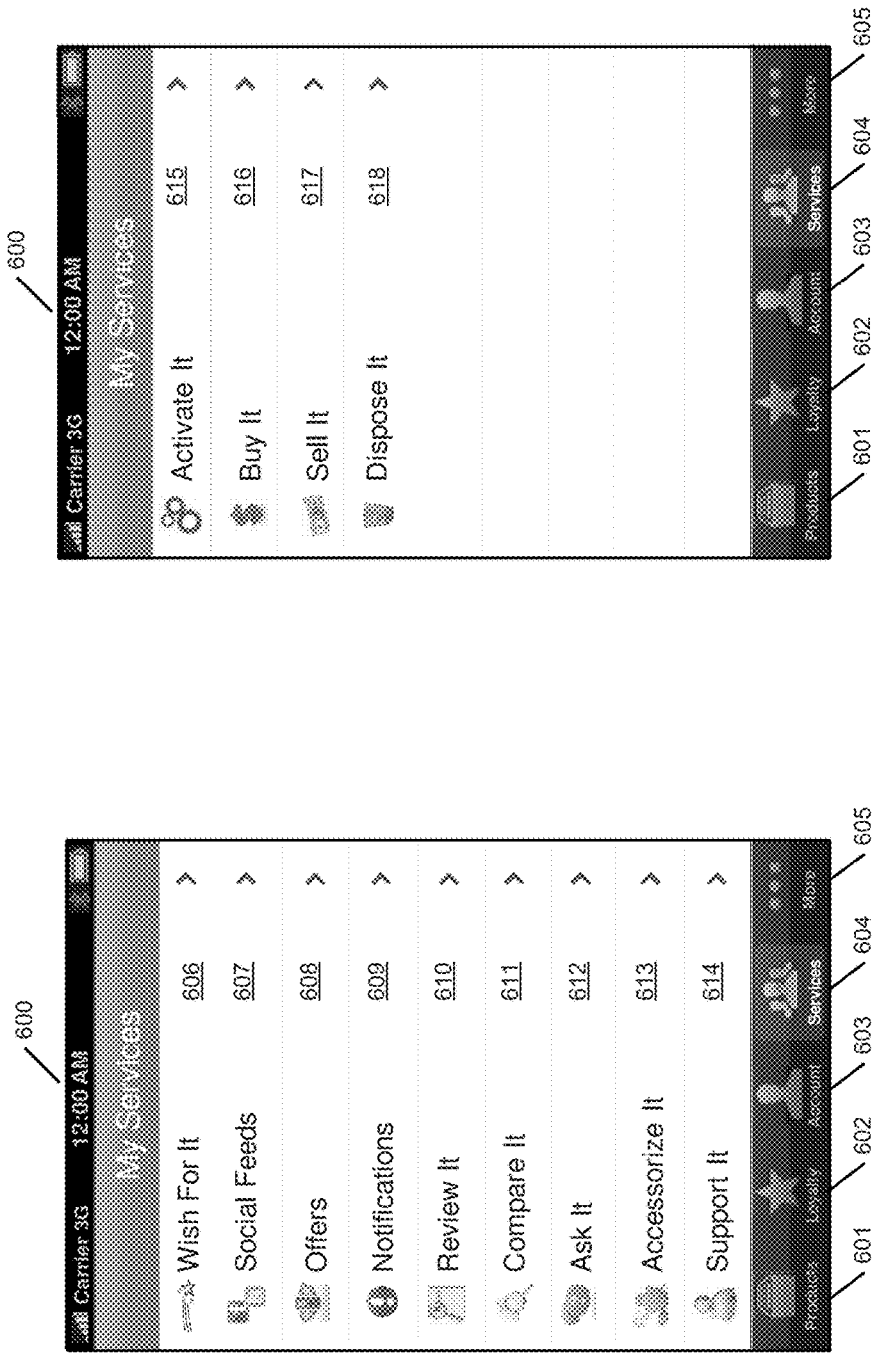
FIGS. 6A-6H are screenshots illustrating graphical user interfaces (GUIs) of a mobile application according to one embodiment of the invention.

FIGS. 6A-6H are screenshots illustrating graphical user interfaces (GUIs) of a mobile application according to one embodiment of the invention. For example, GUIs as shown in FIGS. 6A-6H can be presented by application 103 of FIG. 2. Referring to FIGS. 6A and 6B, GUI 600 is displayed when a user launches an application from its mobile device. The application as shown in FIGS. 6A and 6B includes multiple pages 601-605, each of which can be selected and displayed by selecting (e.g., clicking, tapping, or via a voice interactive command) the corresponding graphical representation (e.g., icon). Before a user can access any one of the pages 601-605, the user has to either create a user account or log into an existing user account of the service center. In one embodiment, page 601 is configured to list all of the products that have been registered with the service center. Page 602 is configured to list all of the loyalty or reward programs registered with the service center. Page 603 is configured to access user account with the service center, including user preferences, etc. Page 604 is configured to provide a list of services that the service center can provide, including services 606-618 as shown in FIGS. 6A and 6B.

In one embodiment, a user can compile a list of items the user wishes to have by activating link 606. A user can search for an item that is interesting to the user using a search tool from the application. For example, a user can search on the Internet for an item the user wishes for. Alternatively, the user can scan using a scanning tool a barcode or QR code of the wished product. This is useful when a user is shopping in a retail store in that the user can scan the barcode of the product in order to add the product into its wish list. In one embodiment, for each of the items listed in the wish list, the user can review other people's comments about the product via link 610. In addition, the user can also compare the product with another one via link 611. The user can display detailed comparison information (e.g., side-by-side information). Link 607 can be utilized to access social communities associated with the user, for example, via community service system 105 of FIG. 1. From links 608-609, a user can view or configure messages such as offers, advertisements, or notifications received from a product or service provider, for example, via advertisement system 108 of FIG. 1. A user can also request a support service from the service center via links 612 and 614, for example, via support service system 106 of FIG. 1. A user can also buy an additional product and sell or dispose an existing registered product, via links 616-618, for example, via post market service system 107 of FIG. 1. Further detailed information concerning the services described above can be found in the above incorporated-by-reference patent applications.

Figure 6D:
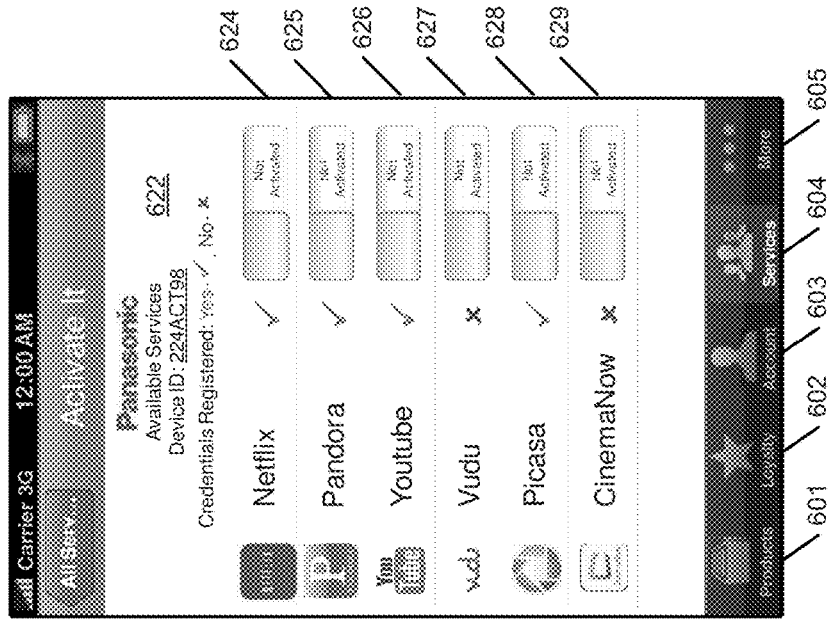
Figure 6C:
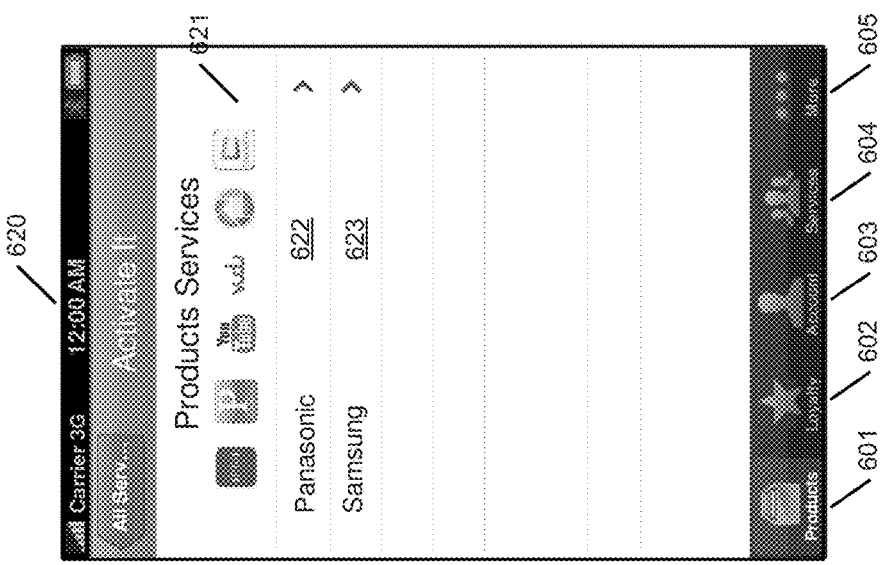
Figure 6F:
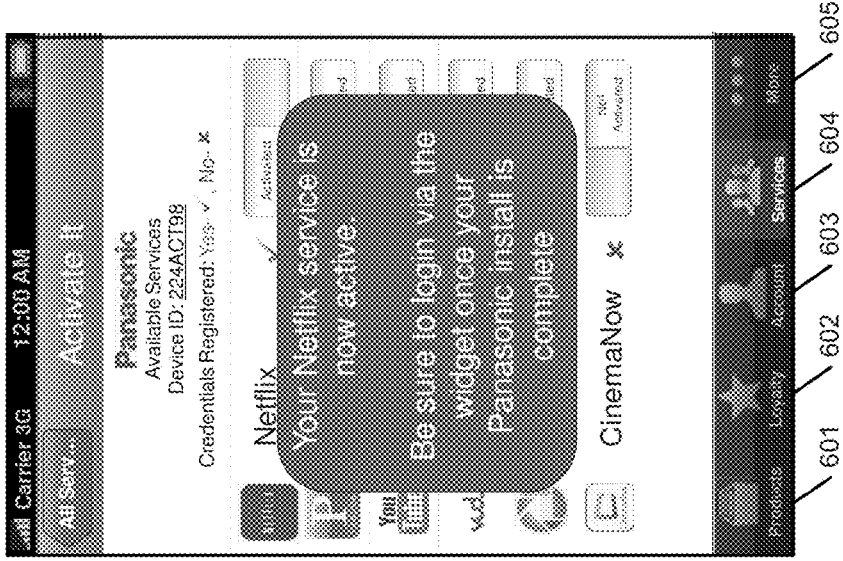

According to one embodiment, GUI 600 further includes link 615 to activate a subscribed service on a product. When a user selects link 615, GUI page 620 as shown in FIG. 6C is displayed. Referring to FIG. 6C, GUI 620 displays a list of subscribed or to be subscribed services 621 that can be activated on a list of registered products 622-623. When any one of registered products 622-623 is selected, an activation page listing all of services that can be activated or deactivated is displayed. It is assumed that a user select product 622, a list of all of the services that can be activated or deactivated on product 622 is displayed as shown in FIG. 6D. Referring to FIG. 6D, for each of the listed services 624-629, there is an associated button or control that can be switch to activate or deactivate that particular service. When the user switches a particular button, information including at least identifiers identifying the product and service is transmitted from the mobile device to the service center to allow the service center communicating with the proper parties or partners to activate or deactivate the selected service on the selected product on behalf of the user, without requiring the user individually contact the service provider for activation or deactivation. Once the service has been successfully activated or deactivated, a notification is received from the service center as shown in FIG. 6F.

Figure 6E:
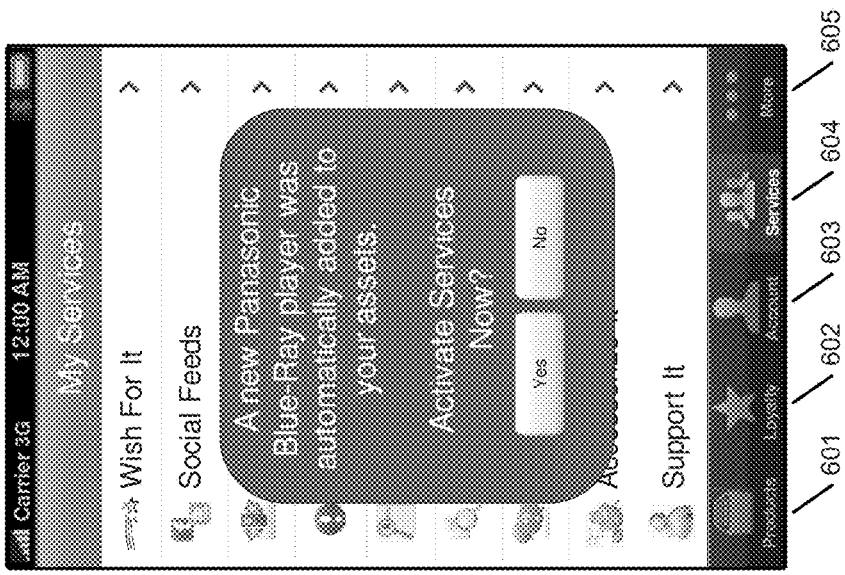
Figure 6H:
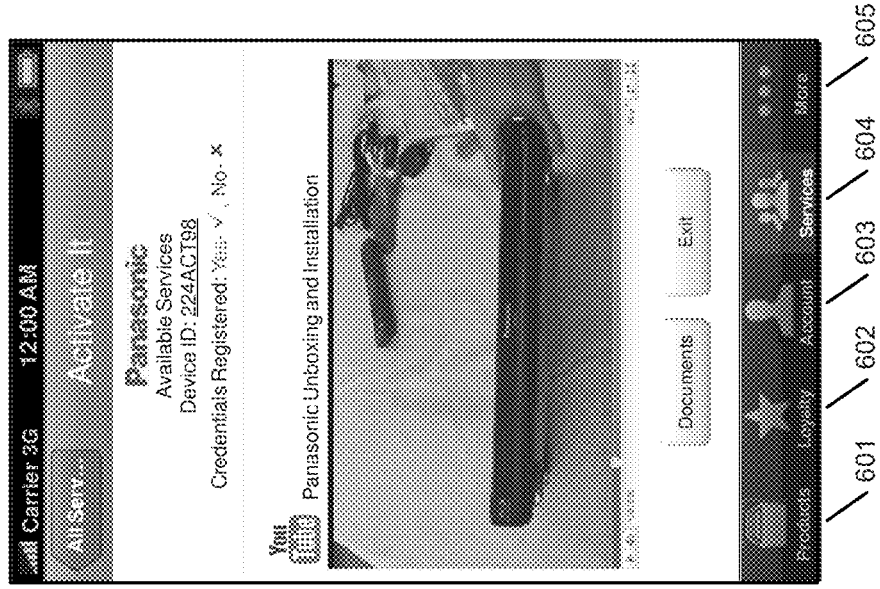
Figure 6G:
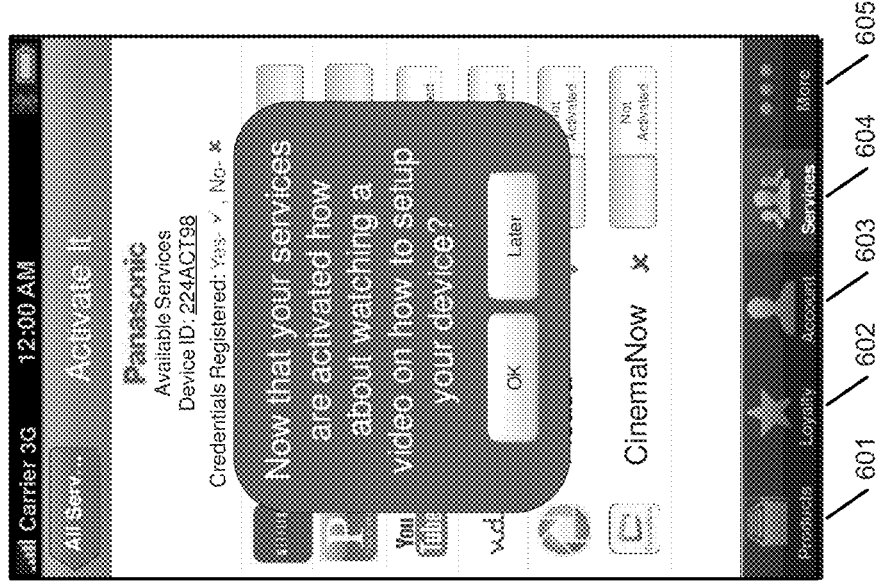

According to one embodiment as described above, a product can be registered by a user manually or it can be registered by the service center automatically. The service center can automatically register a product based on an electronic receipt received from a point of sale location when the product was purchased. According to one embodiment, when the service center has successfully registered a new product, the service center transmits a notification to the user prompting whether the user wishes to activate a service on the newly registered product as shown in FIG. 6E. If the user decides to activate a service on the newly registered product, a GUI page similar to the one as shown in FIG. 6D is displayed. According to one embodiment, after a service has been successfully activated on a product, the service center may cause the mobile application to offer a training session for the product and/or subscribed service as shown in FIG. 6G. If the user responds positively, a media stream (e.g., audio or video stream) is received from the service center and played at the mobile device as shown in FIG. 6H.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory machine-readable medium having instructions stored therein, which when executed by a processor, cause the processor to perform operations of enabling and activating a functionality of an electronic device, the operations comprising:
   receiving at a first server a machine-readable code from a first electronic device over a network, wherein the machine-readable code includes a device identifier (ID) identifying a second electronic device, wherein the first server is associated with a service center that provides support services to a plurality of users on behalf of a plurality of product providers and service providers;
   decoding the machine-readable code to obtain the device ID and a first provider ID, wherein the first provider ID identifies a device provider that provides the second electronic device;
   determining a second server that is associated with the device provider based on the first provider ID;
   transmitting via a first application programming interface (API) at least one of the machine-readable code or the device ID to a second server over the network, wherein the second server is associated with the device provider;
   receiving device information of the second electronic device from the second server over the network, wherein the device information is determined by the second server based on at least one of the device ID or the machine-readable code;
   identifying a subscribed service that can be activated on the second electronic device based on the device information of the second electronic device and service information of the subscribed service, wherein the subscribed service is provided by a service provider;

transmitting a first message to a mobile device of a user associated with the second electronic device via a second API over the network, the first message requesting a permission to activate the subscribed service on the second electronic device; and in response to a second message with the permission received from the mobile device, transmitting, by the activation module via a third API over the network, the device information and the service information to a third server associated with the service provider that provides the subscribed service, wherein the second message is to request the third server to activate the subscribed service on the second electronic device, and wherein the subscribed service is to allow the second electronic device to access one or more resources provided by the service provider based on the subscribed service.

2. The non-transitory machine-readable medium of claim 1, wherein the operations further comprise:

receiving a request for registering the subscribed service with the first server from the mobile device, the request including a service ID identifying the subscribed service;

transmitting the service ID to the third server to obtain the service information of the subscribed service; and storing the service information of the subscribed service in a subscription store associated with the user, including a subscription identifier and the one or more credentials for accessing the service provider.

3. The non-transitory machine-readable medium of claim 1, wherein the operations further comprise storing the device information of the second electronic device in an asset store associated with the user, wherein the asset store is maintained by the first server.

4. The non-transitory machine-readable medium of claim 1, wherein the operations further comprise upon having successfully activated the subscribed service on the first device, transmitting a video stream to the mobile device providing illustration of operating the second electronic device with the subscribed service.

5. The non-transitory machine-readable medium of claim 4, wherein the video stream is retrieved from a remote facility associated with the device provider of the second electronic device or the service provider of the subscribed service without user directly accessing the remote facility.

6. The non-transitory machine-readable medium of claim 1, wherein the operations further comprise:

determining, at the first server, whether a number of existing electronic devices activated with the subscribed service reaches a predetermined threshold; and deactivating the subscribed service from a second device of the existing devices such that the first device can be activated replacing the second device.

7. The non-transitory machine-readable medium of claim 6, wherein the operations further comprise:

transmitting a third message to the mobile device to notify the user that the number of the existing devices associated with the subscribed service reaches the predetermined threshold;

transmitting to the mobile device a fourth message having a summary of existing devices that are currently activated with the subscribed service;

causing the mobile device to request the user to select one or more of the existing devices to be deactivated; and receiving from the mobile device a request for deactivating the second device that was selected from the summary of the existing devices.

8. The non-transitory machine-readable medium of claim 1, wherein the service information includes one or more credentials of the user, and wherein the second message is to request the third server to authenticate the user based on the one or more credentials prior to activating the subscribed service on the second electronic device.

9. A computer-implemented method for enabling and activating a functionality of an electronic device, the method comprising:

receiving, at a first server running on server hardware, a machine-readable code from a first electronic device over a network, wherein the machine-readable code includes a device identifier (ID) identifying a second electronic device, wherein the first server is associated with a service center that provides support services to a plurality of users on behalf of a plurality of product providers and service providers;

decoding, by a registration module hosted by the first server, the machine-readable code to obtain the device ID and a first provider ID, wherein the first provider ID identifies a device provider that provides the second electronic device;

determining by the registration module a second server that is associated with the device provider based on the first provider ID;

transmitting, by the registration module via a first application programming interface (API), at least one of the machine-readable code or the device ID to a second server over the network, wherein the second servers associated with the device provider;

receiving by the registration module device information of the second electronic device from the second server over the network, wherein the device information is determined by the second server based on at least one of the device ID or the machine-readable code;

identifying, by an activation module hosted by the first server, a subscribed service that can be activated on the second electronic device based on the device information of the second electronic device and service information of the subscribed service, wherein the subscribed service is provided by a service provider;

transmitting a first message to a mobile device of a user associated with the second electronic device via a second API over the network, the first message requesting a permission to activate the subscribed service on the second electronic device; and in response to a second message with the permission received from the mobile device, transmitting, by the activation module via a third API over the network, the device information and the service information to a third server associated with the service provider that provides the subscribed service, wherein the second message is to request the third server to activate the subscribed service on the second electronic device, and wherein the subscribed service is to allow the second electronic device to access one or more resources provided by the service provider based on the subscribed service.

10. The method of claim 9, further comprising:

receiving a request for registering the subscribed service with the first server from the mobile device, the request including a service ID identifying the subscribed service;

transmitting the service ID to the third server to obtain the service information of the subscribed service; and storing the service information of the subscribed service in a subscription store associated with the user, including a subscription identifier and the one or more credentials for accessing the service provider.

11. The method of claim 9, further comprising storing the device information of the second electronic device in an asset store associated with the user, wherein the asset store is maintained by the first server.

12. The method of claim 9, further comprising upon having successfully activated the subscribed service on the first device, transmitting a video stream to the mobile device providing illustration of operating the second electronic device with the subscribed service.

13. The method of claim 12, wherein the video stream is retrieved from a remote facility associated with the device provider of the second electronic device or the service provider of the subscribed service without user directly accessing the remote facility.

14. The method of claim 9, further comprising:
determining, at the first server, whether a number of existing electronic devices activated with the subscribed service reaches a predetermined threshold; and
deactivating the subscribed service from a second device of the existing devices such that the first device can be activated replacing the second device.

15. The method of claim 14, further comprising:
transmitting a third message to the mobile device to notify the user that the number of the existing devices associated with the subscribed service reaches the predetermined threshold;
transmitting to the mobile device a fourth message having a summary of existing devices that are currently activated with the subscribed service;
causing the mobile device to request the user to select one or more of the existing devices to be deactivated; and
receiving from the mobile device a request for deactivating the second device that was selected from the summary of the existing devices.

16. The method of claim 9, wherein the service information includes one or more credentials of the user, and wherein the second message is to request the third server to authenticate the user based on the one or more credentials prior to activating the subscribed service on the second electronic device.

17. A data processing system operating as a first server, the system comprising:
a processor;
a registration module executed by the processor;
an activation module executed by the processor; and
a memory coupled to the processor storing instructions therein, which when executed by the processor, cause the processor to perform operations, the operations including
receiving a machine-readable code from a first electronic device over a network, wherein the machine-readable code includes a device identifier (ID) identifying a second electronic device, wherein the first server is associated with a service center that provides support services to a plurality of users on behalf of a plurality of product provides and service providers,
decoding, by the registration module, the machine-readable code to obtain the device ID and a first provider ID, wherein the first provider ID identifies a device provider that provides the second electronic device,
determining by the registration module a second server that is associated with the device provider based on the first provider ID, wherein the second server is associated with the device provider,
transmitting, by the registration module via a first application programming interface (API), at least one of the machine-readable code or the device ID to a second server over the network,
receiving by the registration module device information of the second electronic device from the second server over the network, wherein the device information is determined by the second server based on at least one of the device ID or the machine-readable code,
identifying, by the activation module, a subscribed service that can be activated on the second electronic device based on the device information of the second electronic device and service information of the subscribed service, wherein the subscribed service is provided by a service provider,
transmitting a first message to a mobile device of a user associated with the second electronic device via a second API over the network, the first message requesting a permission to activate the subscribed service on the second electronic device, and
in response to a second message with the permission received from the mobile device, transmitting, by the activation module via a third API over the network, the device information and the service information to a third server associated with the service provider that provides the subscribed service, wherein the second message is to request the third server to activate the subscribed service on the second electronic device, and wherein the subscribed service is to allow the second electronic device to access one or more resources provided by the service provider based on the subscribed service.

18. The system of claim 17, wherein the operations further comprise:
receiving a request for registering the subscribed service with the first server from the mobile device, the request including a service ID identifying the subscribed service;
transmitting the service ID to the third server to obtain the service information of the subscribed service; and
storing the service information of the subscribed service in a subscription store associated with the user, including a subscription identifier and the one or more credentials for accessing the service provider.

19. The system of claim 17, wherein the operations further comprise storing the device information of the second electronic device in an asset store associated with the user, wherein the asset store is maintained by the first server.

20. The system of claim 17, wherein the operations further comprise upon having successfully activated the subscribed service on the first device, transmitting a video stream to the mobile device providing illustration of operating the second electronic device with the subscribed service.

21. The system of claim 20, wherein the video stream is retrieved from a remote facility associated with the device provider of the second electronic device or the service provider of the subscribed service without user directly accessing the remote facility.

22. The system of claim 17, wherein the operations further comprise:
    determining, at the first server, whether a number of existing electronic devices activated with the subscribed service reaches a predetermined threshold; and
    deactivating the subscribed service from a second device of the existing devices such that the first device can be activated replacing the second device.

23. The system of claim 22, wherein the operations further comprise:
    transmitting a third message to the mobile device to notify the user that the number of the existing devices associated with the subscribed service reaches the predetermined threshold;
    transmitting to the mobile device a fourth message having a summary of existing devices that are currently activated with the subscribed service;
    causing the mobile device to request the user to select one or more of the existing devices to be deactivated; and
    receiving from the mobile device a request for deactivating the second device that was selected from the summary of the existing devices.

24. The system of claim 17, wherein the service information includes one or more credentials of the user, and wherein the second message is to request the third server to authenticate the user based on the one or more credentials prior to activating the subscribed service on the second electronic device.

* * * * *